Aug. 31, 1954     J. W. M. DUMOND     2,688,093
POINT FOCUS X-RAY MONOCHROMATORS
Filed Jan. 26, 1951

INVENTOR.
JESSE W. M. DUMOND
BY

Patented Aug. 31, 1954

2,688,093

UNITED STATES PATENT OFFICE 2,688,093

POINT FOCUS X-RAY MONOCHROMATORS

Jesse W. M. Dumond, Pasadena, Calif., assignor to California Institute Research Foundation, Pasadena, Calif., a corporation of California Application January 26, 1951, Serial No. 207,967

5 Claims. (Cl. 250—53)

My invention relates to point focus X-ray monochromators particularly suitable for low-angle diffraction.

An X-ray monochromator capable of forming a beam converging to a point focus has the following advantages for the study of low-angle X-ray diffraction:

The scattered intensity incident in the focal plane is increased in the ratio of the feasible line height to the line width perhaps several hundred fold as compared to a conventional line focus monochromator.

The awkward and complicated analytical process for transforming the line focus diffraction pattern distribution into the point focus distribution is completely avoided.

The object of my invention is therefore to provide:

A point focus monochromator wherein the advantages stated above are obtained.

A further object of my invention is to provide one form of X-ray monochromator which utilizes two successive reflections from crystalline quartz lamina which are cut to a cylindrical shape having a radius of curvature R and subsequently elastically bent to a radius of curvature 0.5R, the X-rays being reflected twice successively from these two lamina under special geometric conditions which insure bringing the radiation to a point focus without astigmatism; thus providing a point focus X-ray monochromator which is particularly suitable for shorter X-ray wave lengths of the order of 1.5 angstrom units.

A further object is to provide another form of point focus X-ray monochromator wherein a mica crystal is curved to provide two different principal radii of curvature and is particularly suitable for long wave length (soft) X-rays in the order of 18 angstrom units.

A further object is to provide a point focus monochromator particularly useful in the new technique of "Low-Angle X-Ray Diffraction," a technique which has found its chief application to date in the determination of the sizes of small particles and large molecules in the solution of various chemical, bio-chemical, and biological problems.

With the above and other objects in view, reference is directed to the accompanying drawings in which.

Figure 1:
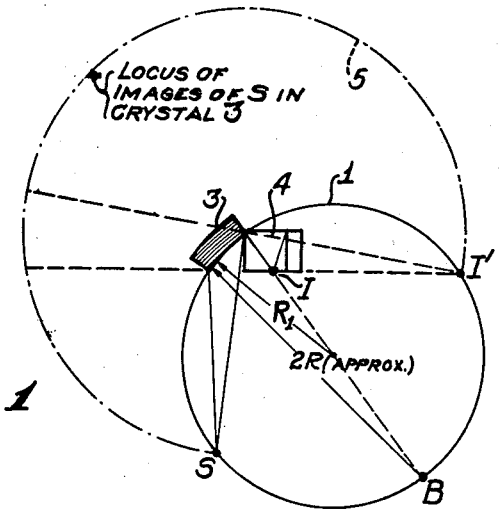
Figure 1 is a diagrammatical, vertical elevation of one form of my point focus X-ray monochromator.
Figure 2:
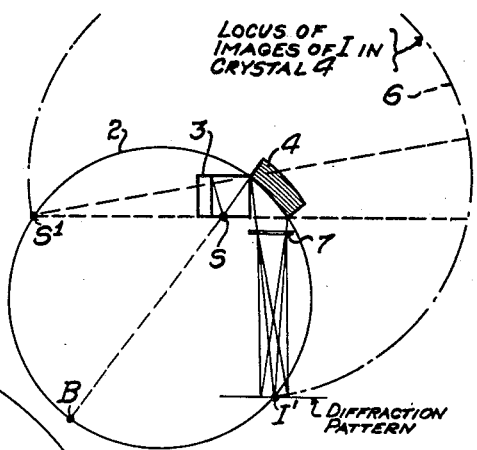
Figure 2 is a diagrammatical horizontal plan view thereof.

Reference is directed to Figures 1 and 2. Two monocrystalline quartz laminae are cut to a cylindrical shape in the unstressed state; the concave surface being of a radius R. The laminae are so cut that, for example, the planes of Miller indices (310) ($d=1A$) are parallel to the plane tangent to the cylinder at one end of the cylindrical arc. The laminae are then elastically bent in a precisely profiled holder so that the surface which had a radius R now has a radius $R/2$. This fulfills the condition for monochromatization and exact focussing for all points on the cylindrical crystal arc.

In the diagrammatical view, Figures 1 and 2, the full line circles 1 and 2 are the loci of real focal points (both source and image) for each crystal designated 3 and 4 respectively.

The crystals are placed so that the generators of the two cylindrical surfaces are mutually at right angles. Thus in the drawings the broken line circles designated 5 and 6 are the loci on which lie the images of each focal point mirrored in the different planes, in the present case the planes of Miller indices (310), along the bent crystal arc.

In the drawing a source focal point S and an image focal point I are indicated. The foci S and I shown are approximately those for Cu-K radiation.

For irradiation of different wave length, the source and image points would be symmetrically located in the circles 1 and 2. That is to say, the source points S and the homologue I' of the image point I on the full line circle of Figure 1 are symmetrically located on either side of the point B which is the center of curvature of the crystalline atomic planes used for reflecting the X-rays.

With the arrangement indicated, radiation from point S is reflected by crystal 3 to crystal 4 causing the final beam to converge at point I.

In utilizing the monochromator, the scattering sample or specimen indicated by 7 is placed near the second crystal 3 in the final double converging beam, and, for best focussing, should coincide nearly with the polar region of the surface of a sphere whose opposite pole is at the final focus of the beam.

As indicated by broken converging lines extending from the specimen 7, the diffraction pattern is symmetrically disposed about the point I. By using a series of concentric circular stops of variable radius, the intensity of the point focussed diffraction pattern may be measured by placing annular ring shaped slits of different diameter in the plane of the diffraction pattern normal to the converging beam and measuring the intensity within the series of rings or conversely utilizing a series of discs of varying radius and measuring the radiation outside the areas of the disc.

In the first described form of my invention in which two successive, spectrally selective crystal reflections are used, a further advantage results from the fact that the diffuse (non-selective) scattering from the last crystal is greatly reduced relative to the selectively reflected monochromatic intensity. The elimination of this background of diffuse scattering permits the study of much wider low-angle diffraction patterns. The reason for this improvement comes from the fact that the reflection in the first crystal eliminates the great bulk of the continuous X-ray spectrum incident on the second crystal.

Figure 3:
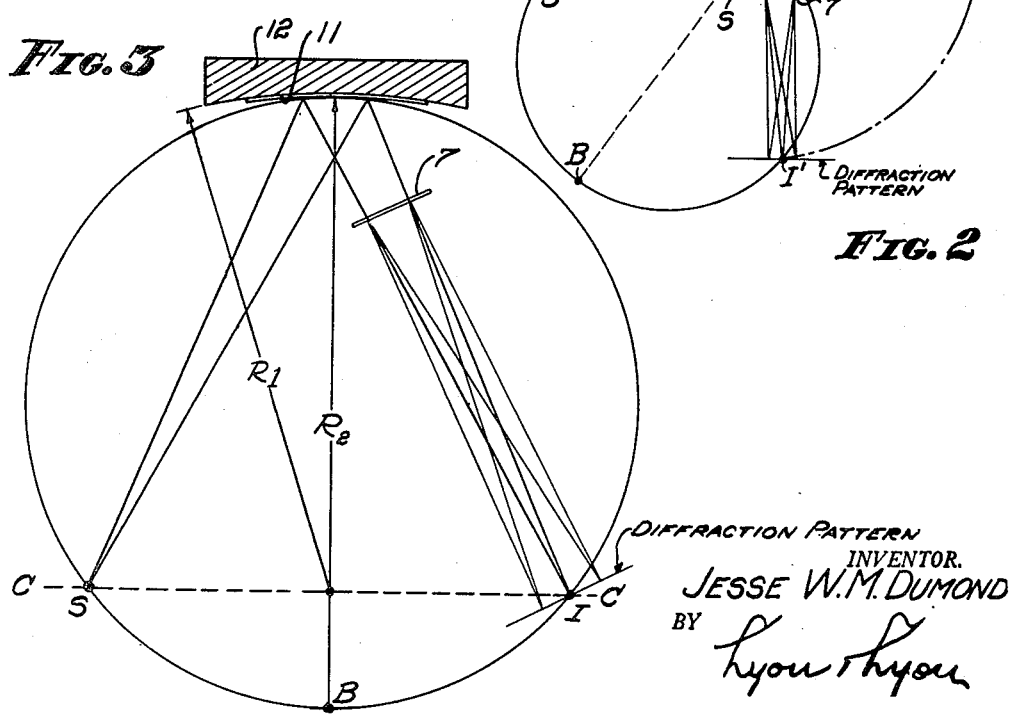
Figure 3 is a diagrammatical view of a modified form of my point focus X-ray monochromator.

Reference is now directed to the diagrammatical view in Figure 3. In this arrangement, a mica crystal 11 of uniform thickness is bent by cementing it under pressure to a carefully figured concave surface of a metal block 12 having two different principal radii of curvature $R_1$ and $R_2$. The line C—C represents the axis of rotation on which a concave surface of radius $R_2$ is generated. The mica crystal is made as thin as possible, preferably in the order of a few thousands of an inch or less. In the arrangement shown in Figure 3, $R_2/R_1 = \sin^2 \theta$ where $\theta$ is the Bragg angle. Figure 3 shows the approximate geometry for monochromatization of fluorine K radiation from a fluoride target. The permissible crystal arc of radius $R_1$ is limited by aberration. But for the production of a point focus there is no limit whatever to the angular extent over which the radius $R_2$ sweeps about the axis C—C. The arc may even be a complete circle if this does not interefere with obtaining good homogeneity of the scattering angle for a sample whose low-angle diffraction pattern is being studied. However, it is preferable to use the complete circle arrangement only for a much shorter wave length and smaller Bragg angle than the fluorine K radiation here indicated.

The source point S and image point I are located on the axis C—C and are symmetrically situated on the circle SBI on either side of the point B. The point B is the center for $R_1$, one of the principal radii of curvature of the surface which supports and defines the shape of the crystalline wafer. S, the center B of the radius line $R_1$ and I all lie on a common circle tangent to the crystal.

Having fully described my invention, it is to be understood that I do not wish to be limited to the details herein set forth, but my invention is of the full scope of the appended claims.

I claim:
1. A point focus X-ray monochromator, involving: a thin X-ray reflecting crystal having a concave radius of curvative in one plane of $R_2$ and a concave radius of curvative in a perpendicular plane of $R_1$ wherein $R_2/R_1 = \sin^2 \theta$ where $\theta$ is the Bragg angle.

2. A point focus X-ray monochromator, involving: a metal block having mutually perpendicular concave surfaces of radii of curvature $R_1$ and $R_2$ wherein $R_2/R_1 = \sin^2 \theta$ where $\theta$ is the Bragg angle: a thin X-ray reflecting crystal intimately conforming with the concave surface of said block.

3. A point focusing X-ray monochromator comprising a reflecting surface adapted to select from the radiation in an X-ray beam incident thereon one sharply defined monochromatic wave length, and with atomic planes of such concave curvature as to cause said radiation to converge to a substantially point-like focus of small dimensions relative to the distance from said reflecting surface to said focus point; means for directing a beam of X-radiation from a source of X-rays against said reflecting surface for reflection to said point-like focus after monochromatization by reflection at said reflecting surface; and means for interposing a specimen to be studied between the reflecting surface and said point focus.

4. A point focusing X-ray monochromator as set forth in claim 3 wherein: said reflecting surface is formed by a thin curved X-ray reflecting crystal having a concave radius of curvature $R_1$ in one plane and a concave radius of curvature $R_2$ in a perpendicular plane wherein $$R_2/R_1 = \sin^2 \theta$$

and wherein $\theta$ is the Bragg angle for selective X-ray reflection of the X-radiation from the atomic planes of said curved crystal.

5. A point focusing X-ray monochromator as set forth in claim 3 wherein: said reflecting surface is formed from a thin crystal; said crystal is backed by and intimately conforms to a rigid block having a curved surface with two principal radii of concave curvature $R_1$ and $R_2$ wherein $R_2/R_1 = \sin^2 \theta$ and wherein $\theta$ is the Bragg angle for selective X-ray reflection of X-radiation from the atomic planes of said crystal.

References Cited in the file of this patent
UNITED STATES PATENTS

| Number | Name | Date |
|---|---|---|
| 1,959,785 | Gray | May 22, 1934 |
| 2,452,045 | Friedman | Oct. 26, 1948 |
| 2,532,810 | Harker | Dec. 5, 1950 |
| 2,540,821 | Harker | Feb. 6, 1951 |
| 2,557,662 | Kirkpatrick | June 19, 1951 |